United States Patent [19]

Lovenheim

[11] Patent Number: 5,389,984
[45] Date of Patent: Feb. 14, 1995

[54] SYSTEM FOR RECORDING IDENTICAL ELECTRONIC AND PHOTOGRAPHIC IMAGES

[76] Inventor: John E. Lovenheim, 190 Council Rock Ave., Rochester, N.Y. 14610

[21] Appl. No.: 983,955

[22] Filed: Dec. 1, 1992

[51] Int. Cl.$^6$ ............... G03B 29/00; G03B 17/38; G03B 15/06
[52] U.S. Cl. ................ 354/76; 354/267.1; 354/290; 358/909.1
[58] Field of Search ............ 354/76, 267.1, 290, 354/430; 358/909.1, 906

[56] References Cited

U.S. PATENT DOCUMENTS

| | | | |
|---|---|---|---|
| 4,027,315 | 5/1977 | Babney | 354/76 |
| 4,285,587 | 8/1981 | Schiff | 354/76 X |
| 4,566,767 | 1/1986 | Akisada | 354/76 |
| 4,603,966 | 8/1986 | Brownstein | 354/76 X |
| 4,615,596 | 10/1986 | Müller | 354/76 |
| 4,616,926 | 10/1986 | DiPietro | 354/76 X |
| 4,618,239 | 10/1986 | Sakamoto | 354/76 X |
| 4,738,526 | 4/1988 | Larish | 354/290 X |
| 4,799,072 | 1/1989 | Akimoto | 354/76 X |
| 4,805,037 | 2/1989 | Noble | 354/76 |
| 4,835,563 | 5/1989 | Larish | 354/76 |
| 4,864,410 | 9/1989 | Andrews | 358/909 X |
| 4,903,057 | 2/1990 | Yamamoto | 354/290 X |
| 4,959,670 | 9/1990 | Thayer, Jr. | 354/76 |
| 4,972,221 | 11/1990 | Ohnuki et al. | 354/400 |
| 5,006,871 | 4/1991 | Moble | 358/909 |
| 5,008,697 | 4/1991 | Noble | 358/909 |
| 5,053,879 | 10/1991 | Kubota | 354/76 X |
| 5,072,246 | 12/1991 | Thayer | 354/290 X |
| 5,138,460 | 8/1992 | Egawa | 358/909 X |
| 5,140,360 | 8/1992 | Tsukamoto et al. | 354/430 |

FOREIGN PATENT DOCUMENTS 0233736 2/1987 European Pat. Off.
3018722 11/1981 Germany.

OTHER PUBLICATIONS

Electra Vision EV2000, "The Power to be Your Best" brochure.
Electra Vision, "A New Generation of Equipment For the Professional Photographer", brochure.
Studio Pro TM Instant Preview Systems, brochure.
Instant Proofing Systems, Dr. Harry J. Oles.
"You're a VIP with Cokesbury and Olan Mills", Olan Mills, p. 135.
"A Whole Family of Instant Proofing Systems".
"Proofless Operation Saves Time, Boosts Sales", Mike Daniel, p. 8.
Highlights, "EPS Introduces the New Studio Pro Instant Preview System", vol. 1, No. 11, Spring 1991.
Highlights, "EPS Enters Electronic Imaging", vol. VI.
"A Whole Family of Instant Preveiw Systems", Studio Pro, pp. 78–85.
"Danny Mfg. Co., Inc. Enters Market With New Electronic Preview System", Background Times.
"Electronic Proofing Has Landed", Denny Variali, Chairman of Denny Electravsion Co., Inc.
"$7,595 Plus Tax and Shipping", Video Proofs.
"Beattie LRX", Video Proofs.
Sony Service Manual, XC-711/711P.

*Primary Examiner*—Michael L. Gellner
*Assistant Examiner*—Jae N. Noh
*Attorney, Agent, or Firm*—Shlesinger Arkwright & Garvey

[57] ABSTRACT

Apparatus for recording a video image which is identical to a photograph of a person includes a video camera for making a video image and a photographic camera having an openable shutter for exposing a piece of film for taking a photograph. A computer is operatively connected to the photographic camera and to the video camera for sending a take signal to the photographic camera at a predetermined time before sending a take signal to the video camera, the predetermined time being equal to the length of time required to open the shutter. Thus the photographic camera takes a photograph which is identical to the video image recorded by the video camera, because the photographic camera and the video camera respond to their respective take signals at the same time.

19 Claims, 3 Drawing Sheets

SYSTEM FOR RECORDING IDENTICAL ELECTRONIC AND PHOTOGRAPHIC IMAGES

FIELD OF THE INVENTION

The invention relates to a system for recording an image of an object on an electronic medium and for recording an identical image of the object on a photographic medium.

BACKGROUND OF THE INVENTION

Despite the availability of inexpensive photographic cameras which allow amateur photographers to take photographs, there remains a demand for studio portrait photography. Studio portrait photography is still popular because beautiful, accurate portraits of individuals are best made under controlled lighting conditions with high quality, professional photographic equipment.

Traditionally, a portrait photographer took various poses of a subject, developed the photographs at a later time, and had the subject return for approval of "proofs." The proofs selected by the subject would then be reproduced in greater quantity and in different sizes as desired by the subject/customer. Needless to say, this was a very time-consuming process that required lots of effort. Furthermore, occasionally no proofs would be satisfactory to the customer, or through some mishap no photographs would be suitable, and another photographic posing session would have to be scheduled.

"One-hour" development of photographic film is now commonplace thanks to automation. It is possible, therefore, to provide a customer with proofs relatively quickly. However, the problem remains that there may be problems with the actual images of the customer on the photographic proofs. Accordingly, prior studio photography systems have been developed that allow a photography subject to view, such as on a television or video monitor, a likeness similar to the photographic image captured on a film negative, whereby a decision can be made whether or not to develop a particular negative.

To facilitate posing, photographers currently use various reference marks scribed or written directly on a ground glass viewfinder or on an acetate overlay placed on the ground glass. Furthermore, in conventional photography a photographer must manually or through servomotors move and adjust both the camera and the lens settings.

In conventional studio photography, when a take occurs there is an intense strobe flash light for providing the best image of the subject to be photographed and videoed. Conventionally, the photographer or a camera mechanism physically adjusts the f-stop of the video camera lens to compensate for the increased amount of light which will result from the strobe flash, and then physically adjust the f-stop after the take back to the appropriate setting for the less intense ambient studio modeling lights. If the settings on the video camera were always set for the high intensity strobe flash, the video images would be severely underexposed for the modeling light live image. Conversely, if the video camera gain were set for the ambient modeling lights, the flash strobe lights would overexpose the captured image. Consequently, many video cameras have automatic gain controls built into the circuitry, but none responds quickly enough to the changing lighting conditions of a strobe flash to be of any practical use. Accordingly, it has been suggested by those practicing video capture that the studio photography system be set to capture the video image just before the high intensity strobes go off by using the modeling light. This scheme results in a video image which is captured earlier in time than the photographic image; hence, necessarily, the video image and the photographic image, although similar, are not identical.

U.S. Pat. No. 4,835,563 to Larish discloses a portrait studio system for simultaneously recording a color video image of the portrait subject as seen by a photographic camera. That system includes a lens for directing image-forming light from a portrait subject to both a photographic camera and a video camera. A beam splitter directs part of the image-forming light to the video camera while allowing part of the image-forming light to expose a piece of photographic film. When a portrait photograph is to be taken, the operator depresses a push-button on the camera whereby the camera circuitry (in cooperation with a microprocessor) actuates flashlighting of the portrait subject, opens the shutter of the camera, and simultaneously records a video image of the portrait subject. That system works well yet does not take into account timing differences of the video and photographic cameras. There is a need for an even more accurate system for consistently recording identical electronic images of a subject corresponding to the photographic images captured on a photosensitive medium.

Conventional video cameras have a continuous scanning cycle in which images are constantly being temporarily stored by a charge coupled device (CCD) which then downloads the image for storage on video film or into the memory of a computer. When the CCD is being discharged into the vertical register memory, the CCD is unable to record any new video images; i.e., the video device is in a black, download register state, or vertical blanking state, and is incapable of accepting new image data.

Accordingly, problems arise in conventional still photography when a photographic camera is used in conjunction with a video camera for recording video images of a portrait subject so that the subject can view images of what is supposed to be on the photographic film negative. It is desirable to have the portrait subject view these video images so that the subject can decide on which ones of the photographic negatives to develop or print.

If the video image and the photographic image are not identical, the video image corresponding to the photographic negative cannot be selected with certainty. For example, if those two images do not correspond exactly, the video image may look fine with the portrait subject wide-eyed and smiling, while the photographic image recorded at a slightly different time period may show the portrait subject's eyes closed.

In addition, it is desirable to use photographic flash or strobe illumination of a portrait studio subject to achieve high quality video and photographic images. High intensity lighting is desired, as there is a substantial loss of light reflected from the portrait subject into the photographic camera and video camera respectively, owing to the multiple lenses commonly found in such equipment.

Further, high intensity light is desirable owing to the fact that the electric charge on a CCD dissipates (leaks) over time and results in lower voltage and intensity; consequently, the greater the initial illumination and, hence, electric charge on a CCD, the greater the remaining electrical charge will be when the CCD is downloaded into electronic storage.

Accordingly, earlier efforts have been directed at controlling different aspects of recording video images, capturing photographic images, and subject illumination, especially when high intensity flash or strobe lighting is used.

U.S. Pat. No. 4,805,037 to Noble et al. discloses controlling the timing of a video camera and preventing transfer of a charge from a CCD to the vertical registers when an image take signal is received in order to prevent an illuminating flash from occurring during the video blanking period or to prevent the flash from being split between the first and second scanning (video) fields.

U.S. Pat. No. 5,006,871 to Noble discloses a system in which a flash strobe is delayed during and prior to the video blanking period so that the flash occurs entirely during field one or field two.

U.S. Pat. No. 5,008,697 to Noble includes a video timing generator (clock) for a video camera, and during the flash the system interrupts the clock generator so image transfer does not take place from a CCD to the vertical registers.

The known prior efforts have been directed at delaying the operation of different parts of the systems within the normal take sequence; none of the conventional devices has coordinated the various elements in order to have the video image and photographic image captured at the identical and optimal point in time.

OBJECTS AND SUMMARY OF THE INVENTION

Accordingly, it is an object of the invention to provide a system for recording identical images of an object on an electronic medium and on a photographic medium that overcomes the drawbacks of conventional devices.

It is a further object of the invention to provide a system for recording identical images of an object that is easy and accurate to use.

It is a still further object of the invention to provide a system for recording identical images of an object at an optimal point in time.

It is another object of the invention to provide a system for recording identical images of an object that is self-calibrating for ensuring that the system operates correctly over time.

It is yet another object of the invention to provide a system for recording identical images of an object on an electronic medium and on a photographic medium, and that accurately records images regardless of lighting conditions.

It is a further object of the invention to provide a system that records identical images of an object while using a high intensity strobe light.

It is another object of the invention to provide a system for recording identical images of an object that reduces the cumulative errors present in conventional systems arising from induced delays of operative components.

It is yet another object of the invention to provide a system for recording identical images of an object that is useful for law enforcement, animal photography, and commercial photography.

It is a further object of the invention to provide a system for recording identical images of an object that facilitates the process of posing the subject to be photographed.

It is another object of the invention to provide a system for recording identical images of an object that automatically provides a repeatable sequence of images of the subject.

It is a still further object of the invention to provide a system for recording images of an object that eliminates the need for a photographic viewfinder.

In summary, therefore, a system for recording an object on an electronic medium and on a photographic medium is provided which includes means for recording an image of an object on an electronic medium, means for capturing an image of the object on a photosensitive medium, and means for controlling the recording means and the capturing means for causing a substantially identical image to be recorded and captured.

In summary, therefore, a system for recording an object on an electronic medium and on a photographic medium is provided which includes means for recording an image of an object on an electronic medium, means for capturing an image of the object on a photosensitive medium, and means for controlling the recording means and the capturing means for causing a substantially identical image to be recorded and captured, the controlling means including means for sending a take request signal when an image of an object is to be recorded and captured, means for determining the lag time required for the take request signal to cause the capturing means to capture an image, and means operatively connected to the take request signal means for causing the take request signal means to send the take request signal to the capturing means at a predetermined time prior to sending the take request signal to the recording means, the predetermined time being equal to the length of lag time determined by the determining means.

DETAILED DESCRIPTION OF THE INVENTION

Figure 1:
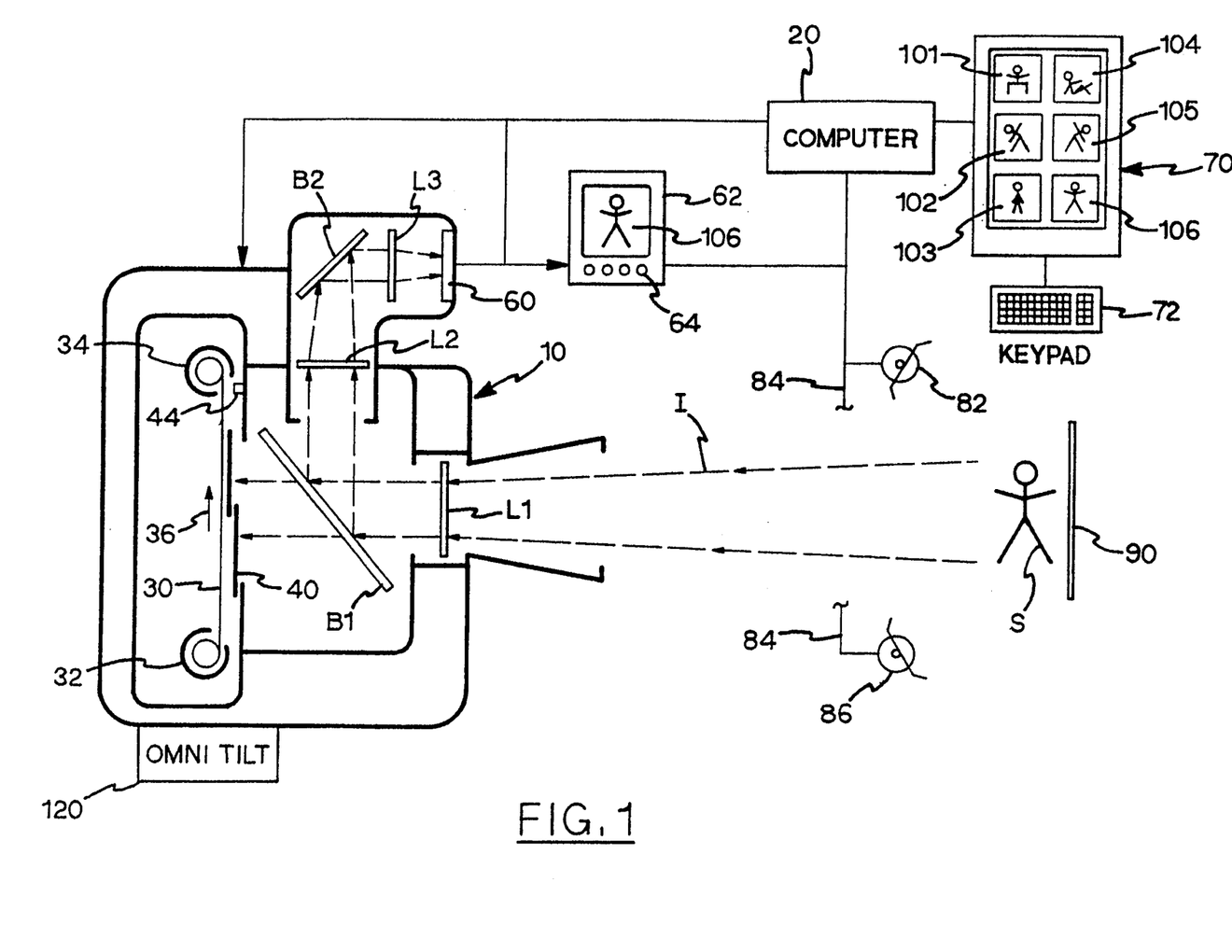
FIG. 1 is a schematic representation of a system for recording identical electronic and photographic images of an object.

FIG. 1 illustrates a preferred embodiment of the system for recording identical electronic and photographic images of an object.

The system includes a photographic/video pickup 10 and a computer 20 electrically connected to operative components of photographic/video pickup 10. The term "computer" as used throughout is to be understood in its broadest sense to include all forms of control apparatuses, data processing equipment, microprocessors, memory chips, microprocessors, hard-wired electrical and electronic configurations, and the like.

A photographic film 30 is held between a film delivery cartridge 32 and a film take-up cartridge 34, photographic film 30 being the medium on which photographic images of a subject S are captured. Photographic film 30 is advanced in the direction of arrow 36, and an image I (i.e., image-forming light) reflected from subject S is recorded on photographic film 30 when a shutter 40 is in an open position. A shutter open sensor 44 determines when shutter 40 is in its closed or opened positions, respectively. This "photography" portion of the photographic/video camera combination 10 records image I after image I passes through a first optical lens $L_1$ and then through a first beam splitter $B_1$.

A video portion of the photographic/video pickup 10 includes a charge coupled device (CCD) 60 electrically connected to a video display 62 having controls 64, all of which are electrically connected to computer 20. Computer 20 is likewise operatively connected to a display monitor 70. A keypad or other input device 72 is operatively connected to display monitor 70, computer 20, and, hence, photographic/video camera combination 10 and video monitor 62.

Image I reaches charge coupled device 60 by way of first passing through first lens $L_1$, being reflected off a beam splitter $B_1$, passing through a second optical lens $L_2$, being reflected off an optional mirror or second beam splitter $B_2$, and finally passing through a third optical lens $L_3$. The path of image forming light being reflected by subject S travels along paths in a manner similar to the paths disclosed in U.S. Pat. No. 4,835,563, which is incorporated herein by reference.

Additional illumination of subject S is provided by a first flash strobe 82 which is operatively connected by a transmission wire 84 (or by an unillustrated wireless transmitter) to a second flash strobe 86. Computer 20 controls the firing of flash strobes 82 and 86, or intercepts and processes the flash request signal, unlike conventional systems in which a signal from a photographic camera directly controls the flash.

An optional high reflection backdrop screen 90 is especially suited for use with background scenery or images, such as a local fire engine for use when taking photographs of children, or a background of shelves full of law books when photographing a lawyer or politician. The background scenery can be projected from conventional photographic slides of the images onto highly reflective screen 90 by the use of a front projector disclosed in U.S. Pat. No. 4,835,563, described above.

Display monitor 70 displays a plurality of successive video images 101, 102, 103, 104, 105, and 106. Display monitor 70 allows the user to view one or more of images 101–106 in a side-by-side fashion so that the user (or the customer buying portrait photographs, for example) can determine which of the images corresponding to the successive images captured on photographic film 30 should be developed and processed as photographs.

An omnitilt device 120 may be connected to photographic/video pickup 10 and operatively associated with computer 20 so that all up and down and side-to-side movements of photographic/video pickup 10 relative to subject S can be governed by and/or remembered by the software of computer 20.

Omnitilt mechanism 120 is useful for remembering a standard position, for example, so that if photographic/video pickup 10 is moved from its standard position for taking a portrait photograph at a predetermined location, the photographic/video pickup 10 can be returned automatically under the direction of computer 20 to its standard position.

Likewise, omnitilt mechanism 120 can be used for making photographs based on a national standard, such as standards promulgated by the Federal Bureau of Investigation (FBI) for taking a series of three standard, successive views of a criminal suspect. Such so-called "mug shots" generally consist of a left-side close view, a front close view, and a front ¾ view of a criminal suspect. The omnitilt mechanism 120, in conjunction with programming of computer 20 to control all movements of photographic/video camera combination 10, such movements including height, tilt, all zoom lens movements such as focal length, f-stop, focusing, and like adjustments, allows consistent mug shot photos to be taken across the country all at consistent focal lengths and heights, for example. A series of preprogrammed movements of photographic/video camera combination 10 can be executed by appropriate programming of computer 20 and by electromechanical control devices available to a person having ordinary skill in the art. Appropriate f-stop settings corresponding to a preprogrammed movement can be likewise concurrently carried out.

Figure 2:
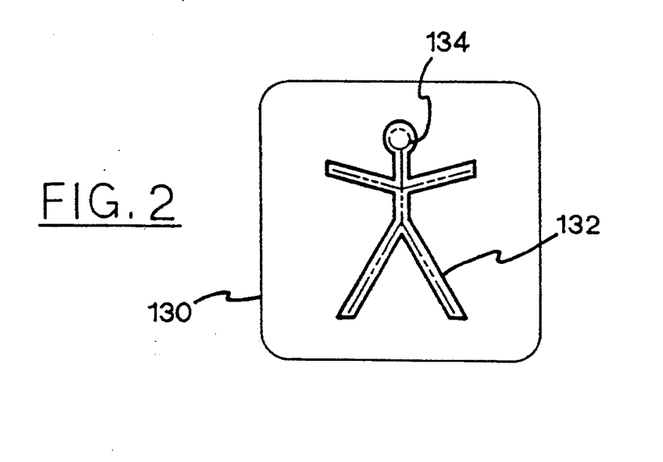
FIG. 2 shows the video image of a photographic subject aligned with a computer-generated reference figure according to the invention.

Turning to FIG. 2, a schematic video screen 130 on which a computer-generated outline FIG. 132 functions as a guideline for positioning an image 134 of a subject S to be photographed. Such a computer-generated image is useful in assisting a relatively unskilled portrait photographer to take high quality photographs of subject S.

Figure 3:
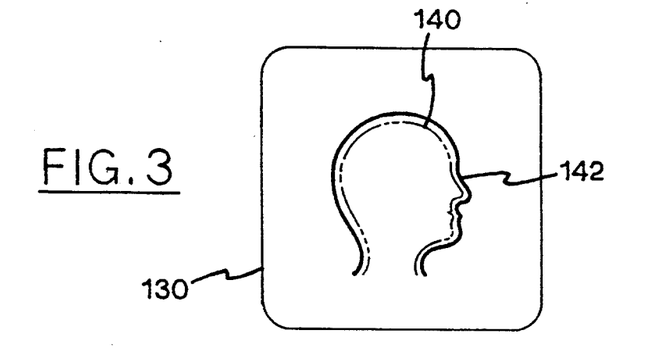
FIG. 3 illustrates the video image of a photographic subject aligned with a computer-generated reference profile according to the invention.

FIG. 3 shows an image 140 of the right-side of the head of a subject S. A computer-generated outline 142 of a standardized head of a subject to be photographed serves as a guide by which the user/photographer knows that the head of subject S is in a proper position for a right-side profile view, such as is commonly required for state driver's licenses and other official uses. The extent of outline figure guide 142 also provides the user with a visual "check" on the positioning and size of the image of subject S that will be captured by photographic/video pickup 10.

Figure 4:
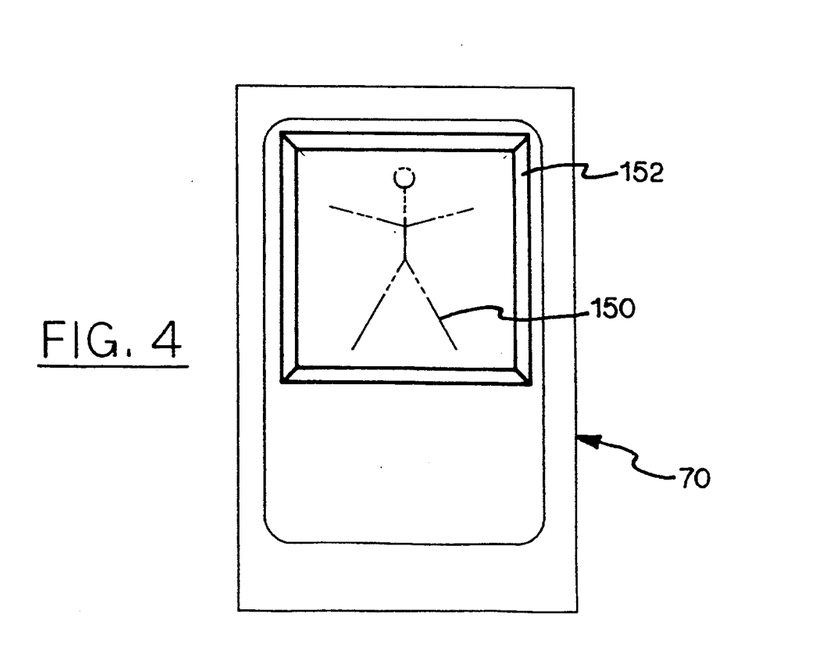
FIG. 4 shows a computer-generated picture frame surrounding a video image of a photographic subject according to the invention; and, FIG. 5 illustrates schematically a series of successive video image scanning fields and the relative times of occurrence of different functions of the system according to the invention.

A single image 150 of a subject S can be displayed on display monitor 70, as illustrated in FIG. 4. A computer-generated mat board or frame 152 surrounds image 150 so as to provide the user with visual information as to how image 150 will appear when its photographic counterpart is placed in a picture frame and surrounded by a mat.

Figure 5:
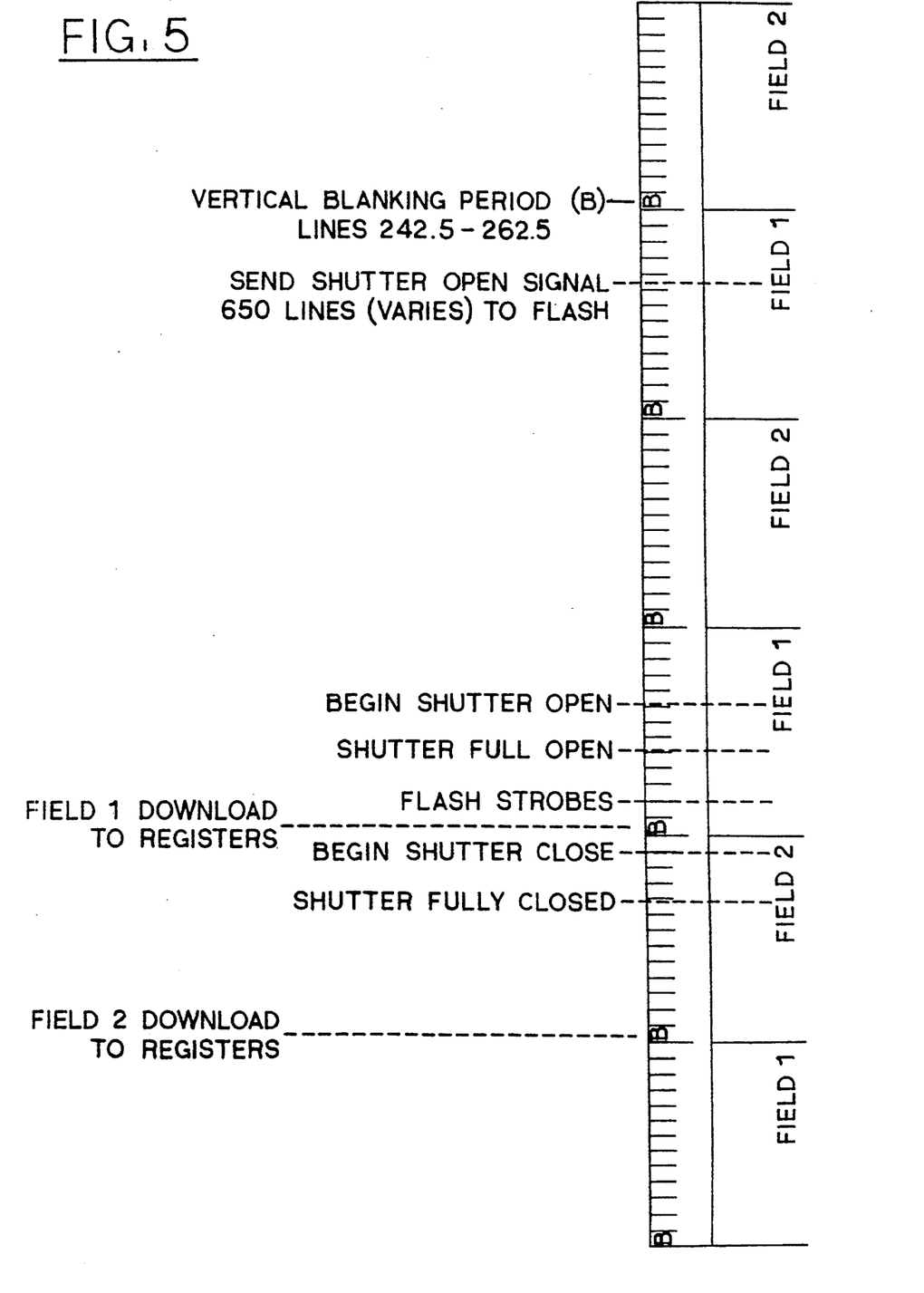

FIG. 5 schematically illustrates a series of pairs of successive video image scanning fields (i.e. alternating field one (1) and field two (2)) of the standard 525-line scanning pattern used in the United States (and also the remainder of North America, South America, and Japan). The system according to the invention is equally suited for the television/video standards found elsewhere in the world, yet will be explained with respect to this 525-line scanning pattern for simplicity.

The operation of the system according to the invention, as well as additional details thereof, will become more apparent from the description of the operation below.

OPERATION

When subject S is to be photographed, the operator positions subject S in front of photographic/video pickup 10. Ambient studio light illuminates subject S.

Conveniently, the operator captures the subject's name, address, and other appropriate database information by keypunching the data into computer 20 via keypad 72. A sitting reference number is assigned to the customer, and the customer name and other information, such as the date, is transmitted to computer 20. Preferably, the date, the sitting number, and an assigned customer identification (ID) number is stored for use in identifying each individual segment of photographic film.

If desired, one of computer-generated stick figures 132 and 142 are displayed on video monitor 62, which is a hand-held device under control of the operator.

The operator begins the camera shooting sequence by activating controls 64. Computer 20 sets the pose number to 1, and photographic/video camera combination 10 is moved automatically to the first desired position by omnitilt mechanism 120 or by direct control of the operator. Likewise, main focusing lens $L_1$ is automatically or manually positioned.

The operator initiates the "take" (i.e., tells the camera to take a photograph) by pressing an appropriate one of controls 64. Computer 20 conducts a routine camera status check including determining whether a piece of photographic film 30 is present in photographic/video pickup 10, whether film 30 is properly loaded, whether the pose number is within acceptable limits, whether the ID information has been accessed, whether strobes 82 and 86 have been adequately charged, and like status checks. The take automatically continues, or the detected problem is communicated to the operator such as by displaying a problem code or a written synopsis of the problem on the screen of video monitor 62.

Computer 20 automatically adjusts the electronic gain in the conventional unillustrated video capture boards associated with the charge coupled device 60 and video monitor 62 in order that strobes 82 and 86 do not overexpose captured image 106 when strobes 82 and 86 fire.

Concurrently, computer 20 is generating the external synchronization of the scanning fields of the photographic/video pickup 10; namely, of the video camera portions thereof, the timing sequence being schematically illustrated in FIG. 5.

After computer 20 has determined where in the timing sequence the video portion of photographic/video pickup 10 the capture boards are, a camera take signal is sent to the camera portion, specifically, to shutter 40 of photographic/video pickup 10.

The optimal time for sending the camera take signal is calculated by computer 20 determining at what point in the timing sequence the present time period is, determining the point at which field 1 will download to the registers (i.e., during a vertical blanking period B, which is generally during lines 242.5–262.5 of respective fields 1 and 2 of the two scanning fields comprising the whole scanning pattern, that is the video scanning frame. (Alternatively, computer 20 can read where in the timing sequence of the scanning fields the video portion of the system is by receiving data from the internal synchronization signals generated by conventional video equipment.) Computer 20 will have previously measured and stored the amount of lag time required from the time the take signal was sent from control 64 to shutter 40 to the time at which shutter 40 was actually, physically in its shutter full open position. Computer 20 determines when shutter 40 is in its full open position by receiving a signal from shutter open sensor 44. Alternatively, a first, sample take is made for calculating the shutter lag time. This can simply be done as the first one of a series of photographs, as multiple photographs will generally be made.

Thus, for example, if the previous take signal required a period of time equivalent to 650 lines, (i.e., a lag time 650 lines long) then the shutter open signal will be sent from computer 20 to shutter 40 by that amount of lag time before sending an actuation/take signal to the flash strobes.

Given the television/video standards present in North America, each scan line ("line") described above as a reference time period is equivalent to about 0.064 seconds.

It is preferred that shutter 40 opens and flash strobes 82 and 86 discharge near to, but not during vertical blanking period B, and preferably, within field 1. The flash is commanded to go off at this time, not only because computer 20 has instructed the electronic gain of the capture boards to be adjusted according to the expected light intensity from the flash of strobes 82 and 86, but also because the electric charge on a conventional charge coupled device dissipates (leaks) over time resulting in lower voltage/intensity for image information to be downloaded and hence, stored, and displayed on video monitor 62.

Computer 20 uses the lag time measured in the previous take for determining how much earlier to send the shutter open signal, in this example sending the shutter open signal 650 lines prior to sending the flash request (i.e., the time period corresponding to 650 lines).

Computer 20 likewise measures the actual time required in the present take, so that a most recently determined camera shutter delay/lag time is always being used. In this manner, variations in the length of time required for the shutter 40 to actually open, owing to mechanical changes in shutter 40, such as wear of shutter 40 and wear on moving parts thereof, as well as dynamic changes such as changes in temperature and humidity which also affect the operation of shutter 40, are continuously accounted for. Consequently, an optimum time for sending the shutter open signal is constantly being updated.

The strobe firing signal is sent by computer 20 to strobes 82 and 86 when shutter 40 is in its full open position. Photographic/video pickup 10 works well because from the perspective of computer 20, the time required for shutter 40 to open fully after the shutter open signal has been sent is relatively long, yet the period of time is relatively fast for shutter 40 which is essentially a mechanical device.

The customer ID information is exposed on a portion of the photographic film at the same time.

Computer 20 then saves these next two video fields in memory, as these particular paired fields serve as the interlaced video fields which will make up the complete video image to provide the desired identical electronic image corresponding to the photographic image.

Computer 20 then digitizes the image, and analyzes the luminance in each of the two fields.

The luminance is balanced in each field, so as to further reduce the flicker inherent in a standard video image comprised of two interlaced pictures (i.e., interlaced fields). Each field is scanned in about 1/60 of a second, the two interlaced fields forming a standard video image taken in 1/30 of a second. The strobe flash generated by strobes 82 and 86 generally occurs in one or two microseconds (1/1000–2/1000 seconds).

As field 1 is read in 1/60th of a second, each adjacent interlaced line in field 2 inherently will be read 1/60th of a second later than its neighboring line in field 1.

In ordinary moving video of dynamic scenes this poses no problem because the charge coupled device is being constantly refreshed by normal, ambient lighting.

In conventional video/photography of static scenes this 1/60th of a second has presented a problem, as the two fields will have even greater differences in luminance owing to the leaking of the electric charge on the CCD. Each adjacent interlaced line from the second field will be inherently "darker" as it has been dissipating its electrical charge 1/60th of a second longer than the immediately preceding line from the first field.

When the video image is displayed on video monitor 62, or on display monitor 70, the more the two fields differ in luminance intensity, the more there will be an optical appearance of flicker or movement on the video monitor. Accordingly, computer 20 compensates by reading the overall luminance of the two fields and electronically balancing them in memory to eliminate the flicker appearance.

Computer 20 then enhances the digital image, and displays the captured image on display monitor 70, display monitor 70 being located in a separate, viewing room, if desired.

Computer 20 now adjusts the electronic gain for standard, ambient modeling light exposure; i.e., computer 20 resets the gain after the two captured video fields have been downloaded.

Finally, the pose number is increased by one, the film usage of photograph film 30 is increased by one, and photographic/video pickup 10 is moved automatically by computer 20 to the next pose position of subject S, if necessary or desired.

After the posing session is complete, a customer will view the poses, i.e. images 101–106, on display monitor 70.

To show the customer how the captured image 150 will look when surrounded by a frame 152, computer 20 generates various frames as selected by commands entered into keypad 72. Thus, the customer is not only shown a video image 150 which is identical to the photographic image captured on photographic film 30, so that only the desired images are developed as finished photographs, and so that the customer immediately sees video equivalents of images captured in the studio, but the customer can see the complete package of captured subject S when a photographic image is eventually framed.

Once the customer has chosen the desired images of subject S, the operator can enter the information into computer 20, whereby the method of payment, the setting information, the inventory of photographic film, and the like are instantly updated.

A non-limiting, exemplary summary of the operation of a basic form of the system according to the invention is as follows: the operator presses control 64 in order to take a desired picture of subject S; control 64 signals computer 20 that a photograph is to be taken; computer 20 determines at what point in the video scanning sequence the video components are; computer 20 has been programmed to discharge the strobes 82 and 86 shortly before the vertical blanking period in field 1, accordingly, an optimal time for discharging the strobes and for having shutter 40 of the photographic camera portion fully open is shortly before that vertical blanking period; computer 20 has determined the length of lag time required for shutter 40 to actually open after a take signal is sent from computer 20 to shutter 40, and, hence, computer 20 sends a take signal to shutter 40 by a period of time equal to the lag time previously determined; computer 20 sends a flash request signal to strobes 82 and 86 at about the same time a take request signal is sent to the video camera portion of the system; consequently, the shutter is fully open at the same time both the flash is discharging and the video camera portion is able to receive images, whereby a photograph identical to a recorded video image is captured.

It is further contemplated that the length of time required for the shutter to open be determined under control laboratory settings and preprogrammed into the system. Alternatively, when the shutter lag time is determined by a practice take, the film advance can be decoupled so that no film is wasted.

Furthermore, temperature monitors can be provided for measuring the temperature of the shutter, for example, so that additional temperature compensation can be made, especially if the temperature of the shutter components differs from the temperature measured the previous time the shutter was operated. When photographs are taken relatively closely spaced together, temperature compensation will usually be unnecessary, as the length of shutter lag time remembered by the computer will be an accurate estimate of the length of shutter lag time likely to occur in the present take. When a photograph taken is the first one of the day, for example, temperature compensation would have greater importance.

Additional monitors can be provided for monitoring bearing wear, relative humidity, and wear of other parts of the electromechanical shutter.

Still further, it is contemplated that the video camera/photography system may include software for governing the optimal time for taking a photograph/recording a video image based on the "speed" of the photographic film, the temperature of the photographic film, and other physical factors. Likewise, nine or more "proofs" may be displayed on a video monitor at one time.

It is anticipated that no photosensitive elements are required, as the system synchronizes the timing of the photographic and video elements so that these elements operate to capture identical images, independent of the timing of the flash.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

We claim:

1. A system for recording an image of an object on an electronic medium and on a photographic medium, comprising:

a) means provided for recording an image of the object on an electronic medium;

b) means provided for capturing an image of the object on a photosensitive medium;

c) means provided for controlling said recording means and said capturing means for causing a substantially identical image of an object to be recorded and captured, said controlling means including:

i) means for sending a take request signal to said recording means and to said capturing means when an image of an object is to be recorded and captured;

ii) means for determining a length of lag time required for the take request signal sent by said take request signal means to cause said capturing means to capture an image of an object; and iii) means operatively connected to said take request signal means for causing said take request signal means to send a take request signal to said capturing means at a predetermined time prior to sending a take request signal to said recording means, the predetermined time being substantially equal to the length of lag time determined by said determining means; and, d) whereby, said recording means records an image of the object that is identical to the image of the object captured by said capturing means.

2. A system for recording an image as defined in claim 1, wherein:

a) said recording means includes a photosensitive electronic image recording means for electronically capturing an image of an object.

3. A system for recording an image as defined in claim 1, wherein:

a) said capturing means includes a means for governing the exposure of a photosensitive medium.

4. A system for recording an image as defined in claim 3, wherein:

a) said governing means comprises a shutter.

5. A system for recording an image as defined in claim 1, wherein:

a) means is provided for splitting an image of an object for directing substantially identical views of the object to said recording means and to said capturing means.

6. A system for recording an image as defined in claim 1, further comprising:

a) a viewing monitor operatively connected to said recording means for displaying at least one image of an object recorded by said recording means.

7. A system for recording an image of an object on an electronic medium and on a photographic medium, comprising:

a) means provided for recording an image of the object on an electronic medium;

b) means provided for capturing an image of the object on a photosensitive medium;

c) means operatively associated with said capturing means for governing the exposure of a photosensitive medium;

d) said governing means having a first state in which a photosensitive medium is prevented from being exposed and a second state in which a photosensitive medium is able to be exposed;

e) means provided for controlling said recording means and said capturing means for causing a substantially identical image of an object to be recorded and captured, said controlling means including:

i) means for sending a take request signal to said recording means and to said governing means when an image of an object is to be recorded and captured;

ii) means for determining a length of governing lag time required for the take request signal sent by said take request signal means to cause said governing means to go from said first state to said second state in which a photosensitive medium is able to be exposed; and iii) means operatively connected to said take request signal means for causing said take request signal means to send a take request signal to said governing means at a predetermined time prior to sending a take request signal to said recording means, the predetermined time being substantially equal to the length of governing lag time determined by said determining means; and, f) whereby, said recording means records an image of the object that is identical to the image of the object captured by said capturing means.

8. A system for recording an image as defined in claim 7, wherein:

a) said recording means includes a photosensitive electronic image recording means for electronically capturing an image of an object.

9. A system for recording an image as defined in claim 7, further comprising:

a) a video display operatively connected to said recording means for displaying an image of an object to be recorded by said recording means.

10. A system for recording an image as defined in claim 7, wherein:

a) said governing means comprises a shutter.

11. A system for recording an image as defined in claim 10, wherein:

a) means is provided for moving said shutter from a closed position to an open position, said closed position corresponds to said first state and said open position corresponds to said second state;

b) means is provided for sensing when said shutter is in said open state; and, c) said determining means includes means for timing a length of shutter lag time required for said shutter to go from said closed state to said open state after a take request signal has been sent from said take request signal means to said governing means.

12. A system for recording an image as defined in claim 7, wherein:

a) means is operatively associated with said controlling means for illuminating an object to be recorded; and, b) said controlling means includes means for instructing said illuminating means to illuminate when said governing means is in said second state.

13. A system for recording an image as defined in claim 12, wherein:

a) means is provided for adjusting the gain of an image recorded on an electronic medium by said recording means; and, b) said controlling means includes means for telling said gain adjusting means to adjust the gain by an amount required to compensate for illumination of an object illuminated by said illuminating means from ambient light to illuminating light when said instructing means instructs said illuminating means to illuminate.

14. A system for recording an image as defined in claim 7, wherein:
   a) means is provided for remembering the length of governing lag time determined by said determining means and for providing a remembered length of governing lag time to said causing means for use as the predetermined time.

15. An apparatus for recording a video image which is identical to a photograph of a person, comprising:
   a) a video camera for making a video image;
   b) a photographic camera having an openable shutter for exposing a piece of film for taking a photograph;
   c) a computer operatively connected to said photographic camera and to said video camera for sending a take signal to said photographic camera at a predetermined time before sending a take signal to said video camera, the predetermined time being equal to the length of time required to open the shutter; and
   d) whereby, the photographic camera takes a photograph which is identical to the video image recorded by the video camera, because the photograph camera opens its shutter and exposes a piece of film at the same time as the video camera makes a video image as instructed by their respective take signals from said computer.

16. An apparatus as defined in claim 15, wherein:
   a) said computer includes means for storing the length of time required for opening the shutter; and,
   b) said computer causes the take signal to be sent to the photographic camera at a predetermined time equal to the length of time required to open the shutter when an earlier photograph was taken.

17. An apparatus as defined in claim 15, wherein:
   a) a flash is operatively connected to said computer; and
   b) said computer causes the flash to operate at the same time as the video camera makes a video image.

18. A system for recording an image of an object on an electronic medium, comprising:
   a) means provided for recording an image of the object on an electronic medium;
   b) a video display operatively connected to said recording means for displaying an image of an object to be recorded by said recording means in a display area of said video display;
   c) means provided for displaying a computer-generated outline figure substantially within said display area of said video display; and,
   d) said computer-generated outline figure being superimposed on said image of an object to be recorded so that the object to be recorded can be aligned relative to said computer-generated outline figure on said video display area.

19. A system for recording an image as defined in claim 18, wherein:
   a) a viewing monitor is operatively connected to said recording means for displaying at least one image of an object recorded by said recording means.

* * * * *